United States Patent
Cheng (10) Patent No.: US 9,182,078 B1
(45) Date of Patent: Nov. 10, 2015

(54) VIDEO WALL MOUNT HAVING ADJUSTING STRUCTURE

(71) Applicant: AOpen Inc., New Taipei (TW)

(72) Inventor: Sheng-Hsiung Cheng, New Taipei (TW)

(73) Assignee: AOPEN INC., New Taipei (TW)

( * ) Notice: Subject to any disclaimer, the term of this patent is extended or adjusted under 35 U.S.C. 154(b) by 0 days.

(21) Appl. No.: 14/609,638

(22) Filed: Jan. 30, 2015

(30) Foreign Application Priority Data

Nov. 26, 2014 (TW) .............................. 103221004 U (51) Int. Cl.
*A47G 1/24* (2006.01)
*F16M 13/02* (2006.01)
*A47G 1/16* (2006.01)
*F16M 11/04* (2006.01)

(52) U.S. Cl.
CPC ........... *F16M 13/022* (2013.01); *A47G 1/1613* (2013.01); *A47G 1/24* (2013.01); *F16M 11/04* (2013.01); *F16M 13/02* (2013.01)

(58) Field of Classification Search
CPC ... A47G 1/1613; A47G 1/1626; A47G 1/164; A47G 1/24; F16M 11/04; F16M 13/022; F16M 13/02; E04G 3/00; A47F 5/08
USPC ........... 248/476, 482, 122.1, 124.1, 919–920, 248/922–923, 222.14, 495, 323
See application file for complete search history.

(56) References Cited

U.S. PATENT DOCUMENTS

| | | | | |
|---|---|---|---|---|
| 2,791,388 A | * | 5/1957 | Hirt .................... | A47G 1/1613 248/495 |
| 2,965,339 A | * | 12/1960 | Denton ................ | A47G 1/1613 248/495 |
| 8,944,393 B2 | * | 2/2015 | Mitsuhashi ............... | G09F 7/18 248/220.22 |
| 2005/0127263 A1 | * | 6/2005 | Lemire ................ | A47G 1/1613 248/475.1 |
| 2005/0242265 A1 | * | 11/2005 | Huang ................... | A47G 1/164 248/490 |
| 2007/0041213 A1 | * | 2/2007 | Short .................... | F16M 11/02 362/561 |
| 2008/0192418 A1 | * | 8/2008 | Zambelli ................ | F16M 11/04 248/222.14 |
| 2008/0277548 A1 | * | 11/2008 | Kameoka ............... | F16M 11/04 248/222.14 |
| 2013/0320169 A1 | * | 12/2013 | Cheng .................. | F16M 13/022 248/231.9 |

* cited by examiner

*Primary Examiner* — Christopher Garft
(74) *Attorney, Agent, or Firm* — McClure, Qualey & Rodack, LLP (57) ABSTRACT

The present creation is a video wall mount having an adjusting structure, which includes a wall fixing rack, a mounting hook, a first adjusting bolt, and a second adjusting bolt. After the mounting hook is locked to the back of a television, and is assembled to the video wall mount, when front-surface evenness needs adjustment, only the first adjusting bolt needs to be rotated. The second adjusting bolt is rotated to adjust a vertical gap. Because only the mounting hook and two adjusting bolts need to be used to adjust front-surface evenness and a vertical gap, a small number of elements are used, and the structure is very simple. In fabrication, the cost can be significantly decreased. Moreover, such an adjusting manner is intuitive and simple in operations, and adjustment operations can be performed immediately without additional reading of instructions or experiments.

11 Claims, 7 Drawing Sheets

VIDEO WALL MOUNT HAVING ADJUSTING STRUCTURE

CROSS-REFERENCES TO RELATED APPLICATIONS

This non-provisional application claims priority under 35 U.S.C. §119(a) on Patent Application No. 103221004 filed in Taiwan, R.O.C. on 2014, Nov. 26, the entire contents of which are hereby incorporated by reference.

BACKGROUND

1. Technical Field

The present creation relates to a video wall mount, and more particularly to a video wall mount on which a left-right or front-rear position of a television can be adjusted.

2. Related Art

Figure 1:
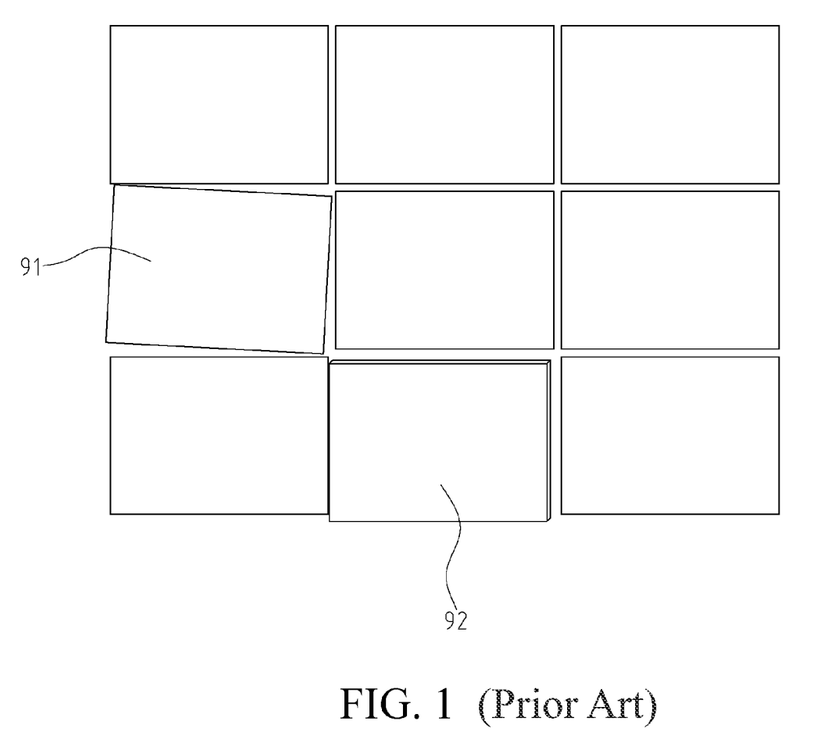
FIG. 1 is a schematic perspective view of a video wall in the prior art.

Televisions have increasingly large sizes and become increasingly thinner nowadays. To save mounting space and take overall appearance into consideration, televisions are often mounted onto a wall by using a wall mount. Moreover, because televisions have increasingly lower prices, many sellers also dispose a video wall to present commodities or play advertisements. As shown in FIG. 1, for a video wall assembled by multiple televisions, whether all televisions are tightly connected is very important. If televisions are not located at a same horizontal plane (for example, a television 91), or are different in terms of front-rear positions (for example, a television 92), a problem of a segmental difference or an uneven picture may occur in a played video.

For a product of a video wall, problems in aspects of tolerance, gaps, and evenness is practically inevitable regardless of how precise construction is carried out. Therefore, fine adjustment of up-down and left-right gaps and front-surface evenness is an essential function. Existing adjusting manners include a manner of adding a pad that is used to adjust a gap or evenness, an automatic adjusting structure using a hydraulic apparatus and the like, and also a manual adjusting structure using a complex frame structure or a multiple linkage manner; however, all these adjusting structures need multiple elements, so that the structure is very complex. Moreover, in the use of an automatic adjusting structure, a frame structure or a multi-linkage structure, because a large number of elements are used, the manufacturing procedure is complex and the cost is also very high. During actual mounting, adjustment is usually needed only in the first time of mounting, and subsequently adjustment is performed only when necessary, so that the cost to spend on an adjusting structure does not need to be very high. Moreover, for both an automatic adjusting structure and a multi-linkage adjusting structure, the adjusting manners need to be learned first to perform needed adjustment accurately, which is relatively inconvenient for a user.

SUMMARY

In view of this, the present creation proposes a video wall mount having an adjusting structure, including a wall fixing rack, at least one mounting hook, a first adjusting bolt, and a second adjusting bolt. The wall fixing rack is provided with at least one locking portion. The locking portion includes a bearing surface and a force-applying surface substantially orthogonal to the bearing surface, and the force-applying surface is provided with a first internal thread. At least one mounting hook is correspondingly hooked on the at least one locking portion, and the mounting hook includes a load-bearing piece correspondingly spanning the bearing surface of the wall fixing rack. The load-bearing piece is provided with a second internal thread. Two opposite sides of the load-bearing piece are respectively extended with a television fixing piece and a thrust piece. The thrust piece is provided with a through hole. The first adjusting bolt passes through the through hole of the thrust piece, and is engaged with the first internal thread of the force-applying surface. The second adjusting bolt is engaged with the second internal thread of the load-bearing piece, and abuts the bearing surface.

Accordingly, when the mounting hook is locked at the back of a television, and is assembled to the video wall mount, when front-surface evenness needs adjustment, only the first adjusting bolt needs to be rotated to actuate the mounting hook and the television front to go forward or backward. When the first adjusting bolt is rotated clockwise, the mounting hook is actuated to move to push the television to move outward. When the first adjusting bolt rotates counterclockwise, the mounting hook is actuated to move to push the television to move inward, so as to achieve the objective of adjusting front-surface evenness of all televisions.

When a vertical gap needs adjustment, the second adjusting bolt is rotated to enable the second adjusting bolt to abut the locking portion, and the load-bearing piece of the mounting hook moves upward or downward to actuate the television to rise or displace downward. Therefore, the objective of adjusting vertical gaps between display screens is achieved. Because the adjusting structure of the present creation only needs to use the mounting hook and two adjusting bolts to adjust front-surface evenness and a vertical gap, a small number of elements are used, and the structure is very simple. In fabrication, the cost can be significantly decreased. Moreover, such an adjusting manner only needs to respectively rotate two adjusting bolts, and therefore is also intuitive and simple in operations, and adjustment operations can be performed immediately without additional reading of instructions or experiments.

The detailed features and advantages of the present creation are described below in detail in the following implementation manners, and the content of the detailed description is sufficient for persons skilled in the art to understand the technical content of the present creation and to implement the present creation accordingly. Based on the content of the specification, the claims, and the drawings, persons skilled in the art can easily understand the relevant objectives and advantages of the present creation.

BRIEF DESCRIPTION OF THE DRAWINGS

The present invention will become more fully understood from the detailed description given herein below for illustration only, and thus are not limitative of the present invention, and wherein.

DETAILED DESCRIPTION

Figure 2:
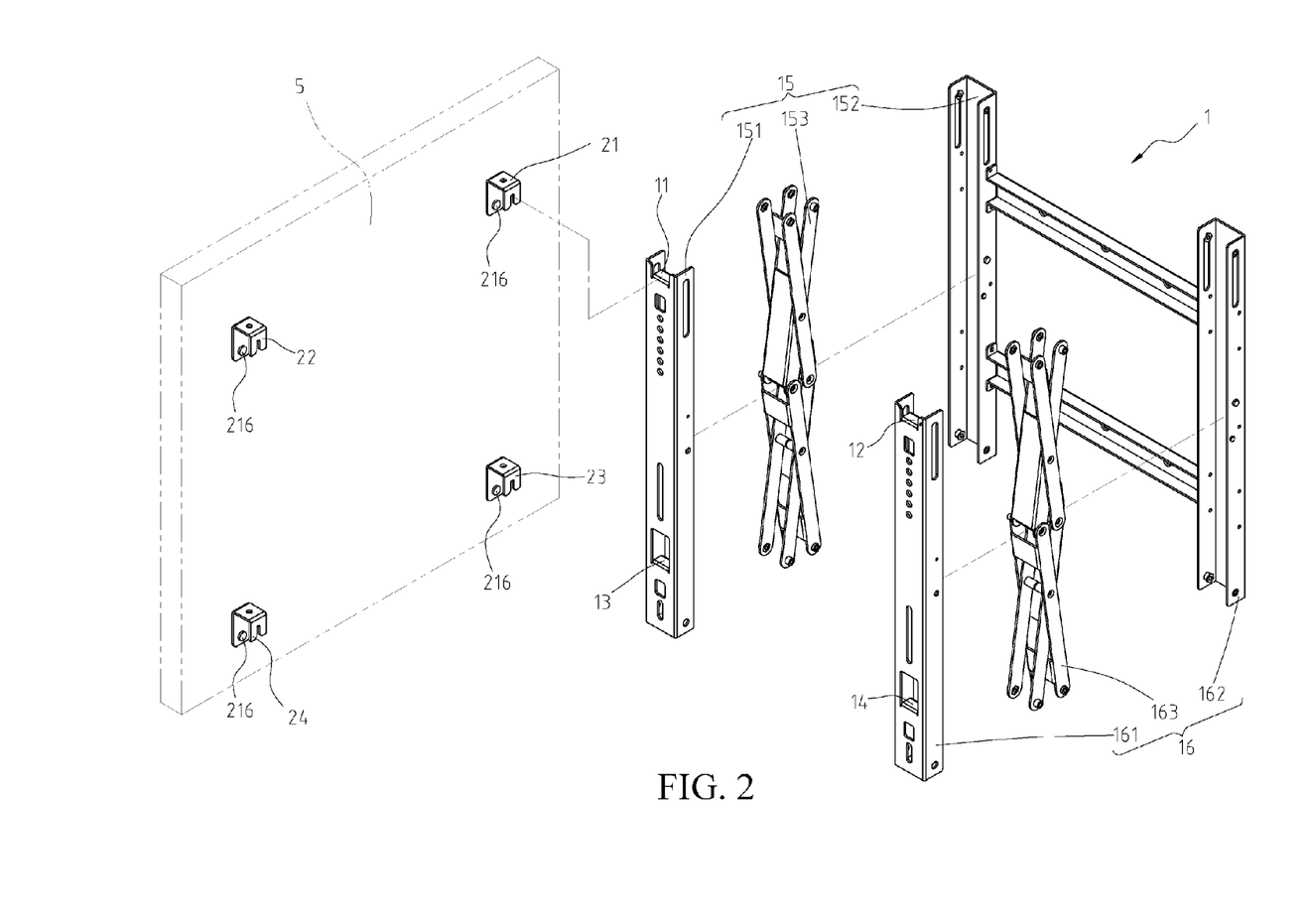
FIG. 2 is a schematic view of a television and a video wall mount according to a first embodiment of the present creation.
Figure 3:
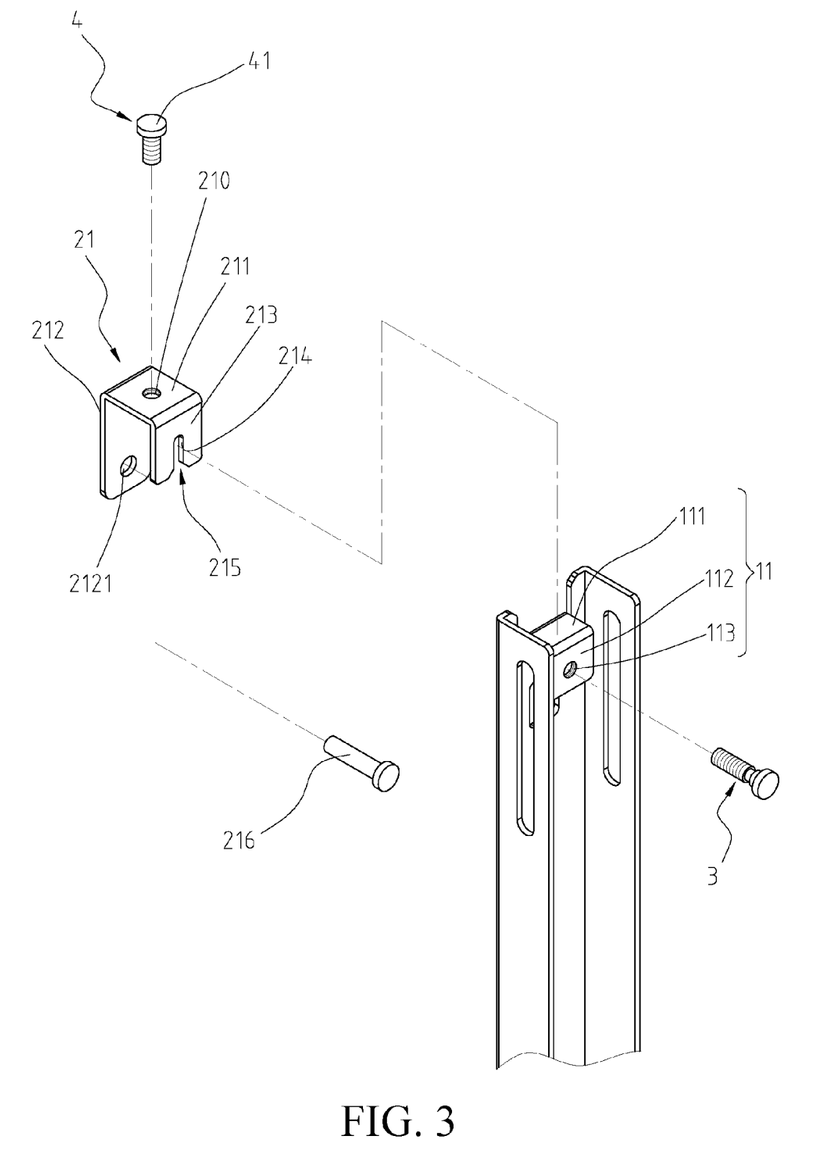
FIG. 3 is a partial enlarged view of the video wall mount according to the first embodiment of the present creation.
Figure 4:
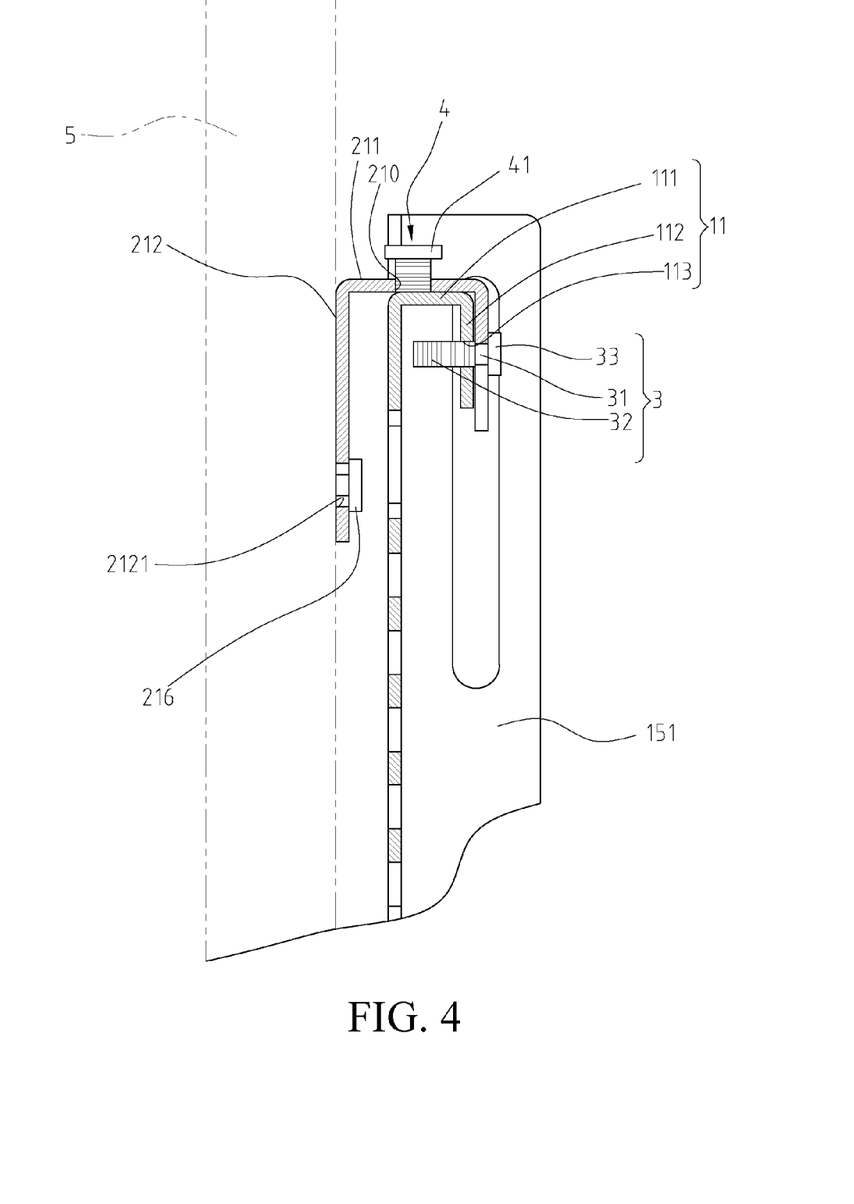
FIG. 4 is a schematic view (1) of adjustment of front-surface evenness according to the first embodiment of the present creation.
Figure 5:
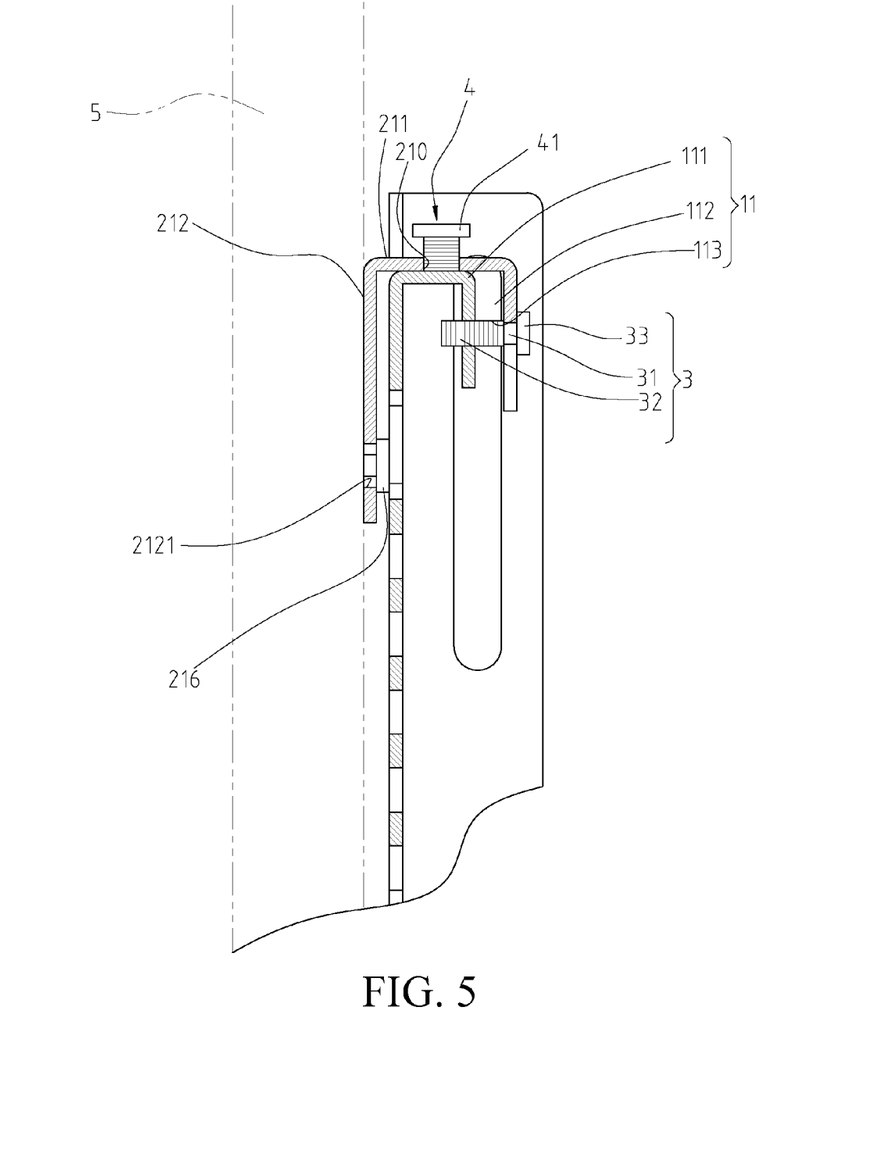
FIG. 5 is a schematic view (2) of adjustment of front-surface evenness according to the first embodiment of the present creation.
Figure 6:
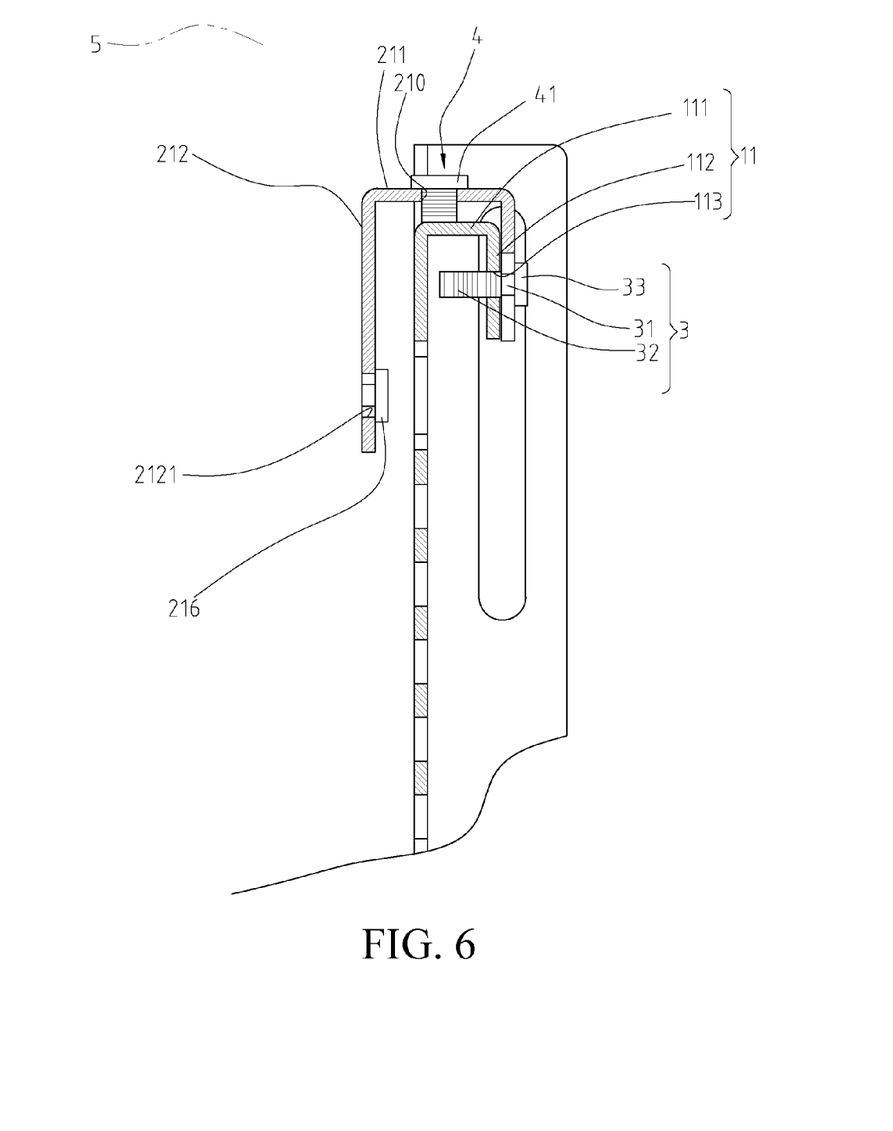
FIG. 6 is a schematic view of vertical adjustment according to the first embodiment of the present creation.
Figure 7:
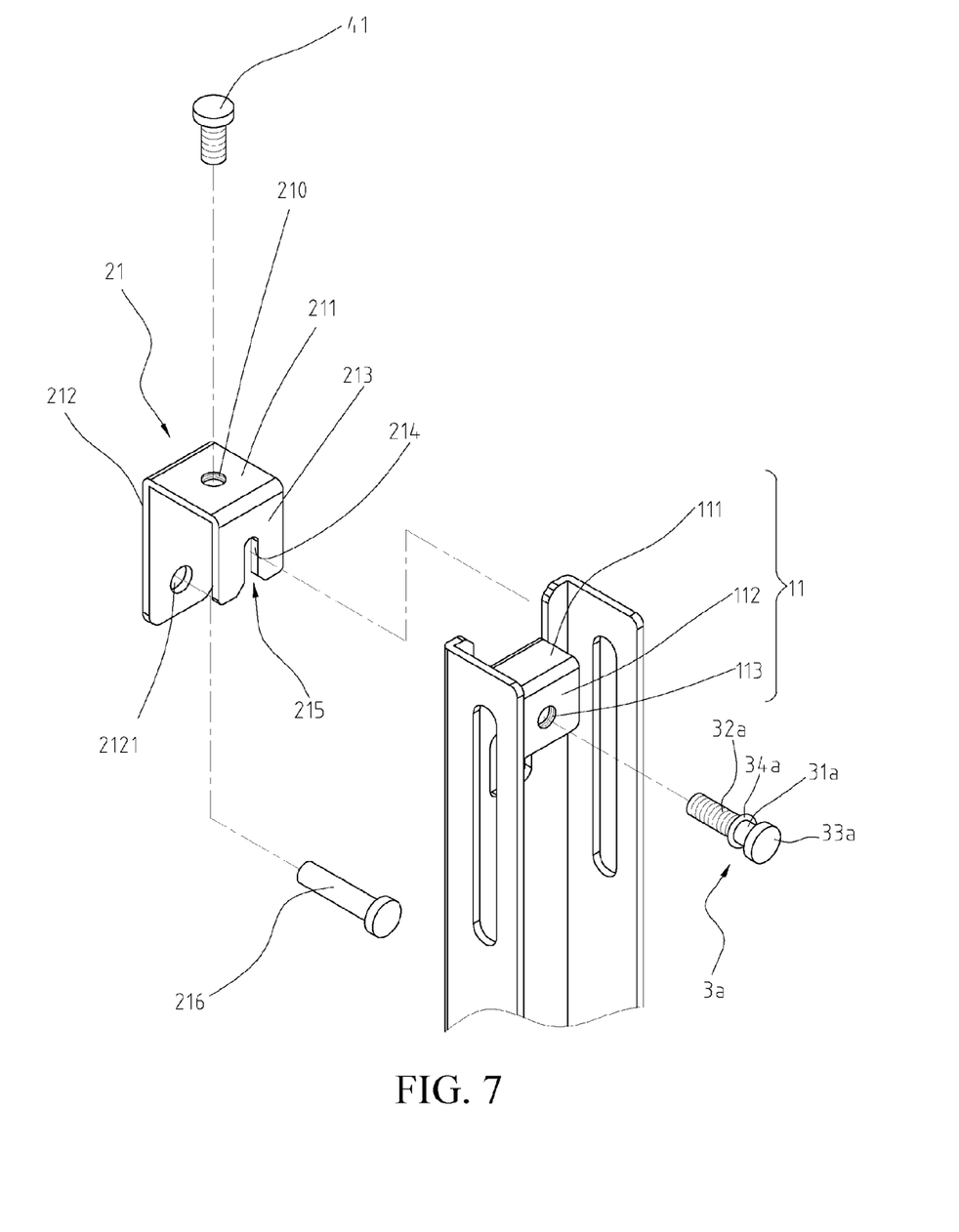
FIG. 7 is a partial enlarged view of a video wall mount according to a second embodiment of the present creation.

In FIG. 2 to FIG. 7: FIG. 2 is a schematic view of a television and a video wall mount according to a first embodiment of the present creation; FIG. 3 is a partial enlarged view of the video wall mount according to this embodiment; FIG. 4 and FIG. 5 are respectively schematic views (1) and (2) of adjustment of front-surface evenness according to this embodiment; and FIG. 6 and FIG. 7 are schematic views of vertical adjustment according to this embodiment.

Referring to FIG. 2 and FIG. 3 at the same time, the video wall mount in this embodiment includes a wall fixing rack 1, four mounting hooks 21, 22, 23, 24, a first adjusting bolt 3, and a second adjusting bolt 4, so as to adjust a mounting position of a television 5. Herein, although the television 5 is used as an example, instead of specifying a display screen having a television function, a variety of display screens may be adjusted. In this embodiment, the wall fixing rack 1 includes a left support 15 and a right support 16. The left support 15 includes a front support 151, a rear support 152, and a folding mechanism 153. The right support 16 also includes a front support 161, a rear support 162, and a folding mechanism 163. In other implementation aspects, the left support 15 and the right support 16 may have the front supports 151, 161 only to fix the television 5, and do not need to have the rear supports 152, 162 and the folding mechanisms 153, 163 at the same time.

The wall fixing rack 1 in this example is provided with four locking portions 11, 12, 13, 14. Although the four locking portions 11, 12, 13, 14 and the four mounting hooks 21, 22, 23, 24 are used as an example, the number of the locking portions and the number of the mounting hooks may be changed according to needs, and the present creation is not limited thereto. For example, the four locking portions may be disposed, but only two mounting hooks are used, where the two mounting hooks are correspondingly hooked to the two locking portions located at an upper end, so that front-surface evenness and a vertical gap can also be adjusted without disposing the four mounting hooks. As can be seen from FIG. 2, the locking portions 11, 13 are disposed on the front support 151 of the left support 15, and are located at upper and lower positions of the front support 151. The locking portions 12, 14 are disposed on the front support 161 of the right support 16, and are also located at upper and lower positions of the front support 161.

The four locking portions 11, 12, 13, 14 and the four mounting hooks 21, 22, 23, 24 are same in structure, and as shown in FIG. 2, the four mounting hooks 21, 22, 23, 24 are locked at four corners at the back of the television 5. Therefore, when the television 5 is placed at the wall fixing rack 1, the four mounting hooks 21, 22, 23, 24 are respectively and correspondingly hooked on the four locking portions 11, 12, 13, 14. Next, the locking portion 11 and the mounting hook 21 are used as an example for description. Referring to FIG. 4 at the same time, the locking portion 11 includes a bearing surface 111 and a force-applying surface 112. The force-applying surface 112 is substantially orthogonal to the bearing surface 111, and the force-applying surface 112 is provided with a first internal thread 113. In a manner of forming the first internal thread 113, the force-applying surface 112 may be provided with an inner threaded hole to form the first internal thread 113. The force-applying surface 112 may also be welded with a nut, and an internal thread of the nut is used as the first internal thread 113. The first adjusting bolt 3 is engaged with the first internal thread 113 of the force-applying surface 112.

The mounting hook 21 is correspondingly hooked on the locking portion 11, and the mounting hook 21 includes a load-bearing piece 211 correspondingly spanning the bearing surface 111 of the wall fixing rack 1. Two opposite sides of the load-bearing piece 211 are respectively extended with a television fixing piece 212 and a thrust piece 213. The television fixing piece 212 is used for locking the mounting hook 21 at the back of the television 5. As shown in FIG. 2 and FIG. 3, the television fixing piece 212 is provided with a fixing hole 2121, so that a fixing screw 216 is used to pass through the fixing hole 2121 and lock the television fixing piece 212 on a back panel of the television 5, enabling the mounting hook 21 to be first locked to the back panel of the television 5.

The thrust piece 213 is provided with a through hole 214, and is a long through hole having an opening 215 in this embodiment. When the mounting hook 21 is correspondingly hooked on the locking portion 11, the first adjusting bolt 3 passes through the through hole 214 of the thrust piece 213 from the opening 215, enabling the load-bearing piece 211 to span the bearing surface 111 of the wall fixing rack 1. In this case, an end, which is near the load-bearing piece 211, of the through hole 214 in the form of the long through hole, abuts the first adjusting bolt 3.

Next, referring to FIG. 4 and FIG. 5 at the same time, after the mounting hook 21 is locked at the back of the television 5, and is assembled to the video wall mount, when front-surface evenness needs to be adjusted, only the first adjusting bolt 3 needs to be rotated to actuate the mounting hook 21 and the television 5 to go forward and backward. As shown in FIG. 4, when the first adjusting bolt 3 is rotated to the bottom, in this case, the front surface of the television 5 is pushed to the outermost position. Next, when the first adjusting bolt 3 is rotated counterclockwise, the first adjusting bolt 3 moves upward as in FIG. 4, that is, actuates the mounting hook 21 to move to push the television 5 inward. The first adjusting bolt 3 may be rotated continuously until the position shown in FIG. 5, that is, the innermost position where the television 5 can be adjusted. During the adjustment, any needed position can be reached to accomplish needed fine adjustment of front-surface evenness. During adjustment, the first adjusting bolt 3 may also be rotated clockwise to actuate the mounting hook 21 to move to push the television 5 outward, that is, to move from the position in FIG. 5 to the position in FIG. 4.

To facilitate adjustment during the rotation of the first adjusting bolt 3, the first adjusting bolt 3 may be a manual rotation bolt. For example, in this embodiment, a disk-shaped operation portion 33 having a large diameter is provided at a position for manual operations and rotation, and an anti-slip groove is further provided at an outer circumference of the operation portion 33. In other implementation aspects, the operation portion 33 may also be a butterfly-form operation portion, a radiating-star-form operation portion, a "-" shaped operation portion or an outer hexagonal operation portion or an inner hexagonal operation portion that needs an assisted operation by using a tool.

To practically actuate the mounting hook 21 to move, the first adjusting bolt 3 has a neck portion 31 and a spiral portion 32. The neck portion 31 has an outer diameter less than that of the through hole 214 of the thrust piece 213, and the spiral portion 32 has an outer diameter greater than that of the through hole 214 of the thrust piece 213. When the first adjusting bolt 3 passes through the through hole 214 of the thrust piece 213 of the mounting hook 21, the thrust piece 213 is sandwiched between the operation portion 33 and the spiral portion 32, and abuts the neck portion 31. When the first adjusting bolt 3 is rotated to move, that is, the spiral portion 32 or the operation portion 33 pushes the thrust piece 213 and actuates the mounting hook 21 to move.

As shown in FIG. 2, the mounting hooks 21, 22, 23, 24 are locked at four corners at the back of the television 5, and are all correspondingly hooked on the wall fixing rack 1 and pass through the first adjusting bolt 3. Therefore, after the television 5 is assembled, when a problem of front-surface evenness of the television 92 as shown in FIG. 1 occurs, only corresponding positions need to be adjusted. For example, if a right side of the television 5 protrudes outward, the first adjusting bolt 3 on the right support 16 may be adjusted to enable the right side of the television 5 to move inward. However, if the right side reaches the innermost position and no adjustment space is left, the first adjusting bolt 3 on the left support 15 may be adjusted to enable a left side of the television 5 to move outward, so that the overall presented result of the front surface is an even plane.

Further referring to FIG. 2, FIG. 5, and FIG. 6, the load-bearing piece 211 is provided with a second internal thread 210. Similarly, in a manner of forming the second internal thread 210, the load-bearing piece 211 may be provided with an inner threaded hole to form the second internal thread 210. Alternatively, the load-bearing piece 211 may also be welded with a nut, so that an internal thread of the nut is used as the second internal thread 210. The second adjusting bolt 4 is engaged with the second internal thread 210 of the load-bearing piece 211, and abuts the bearing surface 111.

When the television 5 needs vertical adjustment, the second adjusting bolt 4 is rotated, so that the second adjusting bolt 4 abuts the bearing surface 111 of the locking portion 11, enabling the load-bearing piece 211 of the mounting hook 21 to move upward or downward to actuate the television to rise or displace downward. Because the load-bearing piece 211 is provided with the second internal thread 210, when the second adjusting bolt 4 is rotated, under the relative effects of the second internal thread 210 and the second adjusting bolt 4, the load-bearing piece 211 moves upward or downward. Therefore, adjustment is performed to the position in FIG. 5 or FIG. 6. The adjustment may also stop at any time based on the needed adjustment degree, so as to achieve the function of fine adjustment.

Similarly, after the television 5 is assembled, when a problem of a vertical gap of the television 91 as shown in FIG. 1 occurs, only a corresponding position needs to be adjusted. For example, if the right side of the television 5 is higher, the second adjusting bolt 4 located at an upper side of the right support 16 may be adjusted to enable the right side to move downward. The second adjusting bolt 4 located at the upper side of the left support 15 may also be adjusted to enable the left side to move upward. Therefore, the overall presented result of the front surface is horizontal rather than being inclined to a side.

To facilitate an adjustment operation, the second adjusting bolt 4 may be a manual rotation bolt. For example, as shown in this embodiment, a disk-shaped operation portion 41 having a large diameter is provided at a position of manual operations and rotation, and an anti-slip groove may be further provided at an outer circumference of the operation portion 41. In other implementation aspects, the operation portion 41 may also be a butterfly-form operation portion, a radiating-star-form operation portion or a "-" shaped operation portion or an outer hexagonal operation portion or an inner hexagonal operation portion that needs an assisted operation by using a tool.

By using the foregoing structure, the adjusting structure in this embodiment only needs to use the mounting hook and adjusting bolts to adjust front-surface evenness and perform vertical adjustment, a small number of elements are used, and the structure is very simple. In fabrication, the cost can be significantly decreased. Moreover, such an adjusting manner only needs to respectively rotate an adjusting bolt, and is also intuitive and simple in operations and adjustment operations can be performed immediately without additional reading of instructions or experiments.

Further referring to FIG. 7, FIG. 7 is a partial enlarged view of a video wall mount according to a second embodiment of the present creation. In this embodiment, elements and structures having the same functions as those in the first embodiment are denoted by the same reference numerals, and elaborate description is no longer repeated. A difference of this embodiment from the first embodiment lies in that a first adjusting bolt 3a has a neck portion 31a, a spiral portion 32a, an operation portion 33a, and a stop piece 34a, where the stop piece 34a is fixedly disposed at a joint between the neck portion 31a and the spiral portion 32a. Moreover, in this embodiment, the neck portion 31a and the spiral portion 32 have nearly the same outer diameter. When the first adjusting bolt 3a passes through the through hole 214 of the thrust piece 213 of the mounting hook 21, the thrust piece 213 is sandwiched between the operation portion 33a and the stop piece 34a, and abuts the neck portion 31a. When the first adjusting bolt 3a is rotated to move, that is, the operation portion 33a or the stop piece 34a pushes the thrust piece 213 to actuate the mounting hook 21 to move.

In this way, a commercially available bolt that usually has a neck portion and a spiral portion with approximate outer diameters may be used, and a stop piece is further disposed, so that the bolt can be used as an adjusting bolt. An adjusting bolt having a neck portion and a spiral portion with different outer diameters does not need to be specially fabricated.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A video wall mount having an adjusting structure, comprising:
   a wall fixing rack, provided with at least one locking portion, the locking portion comprising a bearing surface and a force-applying surface substantially orthogonal to the bearing surface, and the force-applying surface being provided with a first internal thread;
   at least one mounting hook, correspondingly hooked on the at least one locking portion, the mounting hook comprising a load-bearing piece correspondingly spanning the bearing surface of the wall fixing rack, the load-bearing piece being provided with a second internal thread, opposite two sides of the load-bearing piece being respectively extended with a television fixing piece and a thrust piece, and the thrust piece being provided with a through hole;
   a first adjusting bolt, passing through the through hole of the thrust piece, and engaged with the first internal thread of the force-applying surface; and a second adjusting bolt, engaged with the second internal thread of the load-bearing piece, and abutting the bearing surface.

2. The video wall mount having an adjusting structure according to claim 1, wherein the wall fixing rack comprises a left support and a right support, the at least one locking portion includes two locking portions, and the two locking portions are evenly and separately disposed on the left support and the right support.

3. The video wall mount having an adjusting structure according to claim 1, wherein the wall fixing rack comprises a front support, a rear support, and a folding mechanism, and the at least one locking portion is disposed on the front support.

4. The video wall mount having an adjusting structure according to claim 1, wherein the force-applying surface is provided with an inner threaded hole to form the first internal thread.

5. The video wall mount having an adjusting structure according to claim 1, wherein the load-bearing piece is provided with an inner threaded hole to form the second internal thread.

6. The video wall mount having an adjusting structure according to claim 1, wherein the through hole of the thrust piece is a long through hole having an opening.

7. The video wall mount having an adjusting structure according to claim 1, wherein the television fixing piece is provided with at least one fixing hole.

8. The video wall mount having an adjusting structure according to claim 1, wherein the first adjusting bolt has a neck portion and a spiral portion, the neck portion has an outer diameter less than that of the through hole of the thrust piece, and the spiral portion has an outer diameter greater than that of the through hole of the thrust piece.

9. The video wall mount having an adjusting structure according to claim 1, wherein the first adjusting bolt has a neck portion, a spiral portion, and a stop piece, and the stop piece is fixedly disposed at a joint between the neck portion and the spiral portion.

10. The video wall mount having an adjusting structure according to claim 1, wherein the first adjusting bolt is a manual rotation bolt.

11. The video wall mount having an adjusting structure according to claim 1, wherein the second adjusting bolt is a manual rotation bolt.

* * * * *